United States Patent
Kok

(10) Patent No.: US 9,707,675 B2
(45) Date of Patent: Jul. 18, 2017

(54) STRESS RELAXATION DEVICE FOR NAIL GUN

(71) Applicant: King Fai Kenneth Kok, Hongkong (CN)

(72) Inventor: King Fai Kenneth Kok, Hongkong (CN)

(*) Notice: Subject to any disclaimer, the term of this patent is extended or adjusted under 35 U.S.C. 154(b) by 781 days.

(21) Appl. No.: 14/150,775

(22) Filed: Jan. 9, 2014

(65) Prior Publication Data

US 2014/0239566 A1 Aug. 28, 2014

(30) Foreign Application Priority Data

Feb. 22, 2013 (CN) .................. 2013 2 0083436 U

(51) Int. Cl.
| | |
|---|---|
| F16F 7/00 | (2006.01) |
| B25C 1/04 | (2006.01) |
| F16F 3/12 | (2006.01) |
| F16F 3/087 | (2006.01) |
| B25F 5/00 | (2006.01) |
| B25C 1/08 | (2006.01) |

(52) U.S. Cl.
CPC ............... B25C 1/047 (2013.01); B25C 1/08 (2013.01); B25F 5/006 (2013.01); F16F 3/0873 (2013.01); F16F 3/12 (2013.01)

(58) Field of Classification Search
CPC .................................. B25F 5/006; F16F 7/00
USPC .......................................... 227/140; 173/210
See application file for complete search history.

(56) References Cited

U.S. PATENT DOCUMENTS

| | | | | | |
|---|---|---|---|---|---|
| 2,879,986 | A | * | 3/1959 | Maier | F16F 1/445 267/149 |
| 3,115,637 | A | * | 12/1963 | Elliott | B25C 1/146 227/10 |
| 3,190,187 | A | * | 6/1965 | Doyle | B25C 1/045 227/130 |
| 3,273,469 | A | * | 9/1966 | Doyle | B25C 1/047 173/210 |
| 3,403,600 | A | * | 10/1968 | Bade | B25C 1/041 227/130 |
| 3,784,182 | A | * | 1/1974 | Sobel | B60R 19/22 188/268 |
| 4,609,135 | A | * | 9/1986 | Elliesen | B25C 1/047 173/210 |
| 5,538,172 | A | * | 7/1996 | Jochum | B25C 1/14 173/212 |
| 5,950,900 | A | * | 9/1999 | Frommelt | B25C 1/14 227/9 |
| 6,059,163 | A | * | 5/2000 | Pfister | B25C 1/14 173/211 |
| 6,123,242 | A | * | 9/2000 | Kersten | B25C 1/14 173/212 |

(Continued)

*Primary Examiner* — Gloria R Weeks

(57) ABSTRACT

A nail gun includes: a shell, a cylinder, a piston, a gear frame, and a stress relaxation device. The cylinder is disposed in the shell. The piston is disposed in the cylinder and includes a piston rod and a piston disc. The gear frame is coated on a front section of a cylinder exterior. The stress relaxation device is disposed in the cylinder. The stress relaxation device includes a first stress relaxation ring, a second stress relation ring and a stress relaxation unit. The first stress relaxation ring and the second stress relaxation ring are both connected with the stress relaxation unit and not in relative movement to the stress relaxation unit.

5 Claims, 4 Drawing Sheets

(56) References Cited

U.S. PATENT DOCUMENTS

| | | | | |
|---|---|---|---|---|
| 6,123,243 A * | 9/2000 | Pfister | ................ | B25C 1/14 173/211 |
| 6,220,495 B1 * | 4/2001 | Jakob | ................ | B25C 1/14 227/10 |
| 6,779,698 B2 * | 8/2004 | Lin | ................ | B25C 1/14 173/210 |
| 6,779,955 B2 * | 8/2004 | Rivin | ................ | B23B 31/006 188/379 |
| 6,889,884 B2 * | 5/2005 | Jakob | ................ | B25C 1/14 227/10 |
| 7,055,727 B2 * | 6/2006 | Rohrmoser | ................ | B25C 1/14 227/10 |
| 7,131,563 B2 * | 11/2006 | Wen | ................ | B25C 1/047 173/211 |
| 7,357,194 B2 * | 4/2008 | Koschel | ................ | B25D 17/24 173/117 |
| 7,377,331 B2 * | 5/2008 | Chen | ................ | B25B 21/00 173/104 |
| 7,407,071 B2 * | 8/2008 | Sperrfechter | ................ | B25C 1/14 227/10 |
| 8,371,488 B2 * | 2/2013 | Hahn | ................ | F16F 7/015 227/10 |
| 8,978,953 B2 * | 3/2015 | Blessing | ................ | B25C 1/003 227/156 |
| 2004/0231869 A1 * | 11/2004 | Bernhart | ................ | B25D 17/00 173/210 |

\* cited by examiner

STRESS RELAXATION DEVICE FOR NAIL GUN

CROSS REFERENCE OF RELATED APPLICATION

The present invention claims priority under 35 U.S.C. 119(a-d) to CN 201220083436.2, filed Feb. 22, 2013.

BACKGROUND OF THE PRESENT INVENTION

Field of Invention

The present invention relates to a nail gun, in particular to a stress relaxation device used on the nail gun to reduce and absorb the complementary wave of the impact of the piston during nail shooting.

Description of Related Arts

At present, nail guns with different power are produced for different operation objects and operation sites. All nail guns have a problem during working. The dynamic force of the piston is usually not exhausted after nail shooting, and the rest of the dynamic potential energy will inevitably impact parts of a nail gun such as the cylinder and shell to damage the nail guns and shorten the service life of the nail guns. To prolong the service life of the nail guns, manufacturers use a great amount of metal parts (such as alloy shell) on the nail guns to increase the strength. However, doing so not only increases the cost, but also makes the gun nails heavy, so the nail guns are unaccepted on the market and cannot be widely applied.

SUMMARY OF THE PRESENT INVENTION

For the above reasons, the present invention provides a stress relaxation device for a nail gun. The stress relaxation device comprises a stress relaxation unit, and a stress relaxation and shock absorption device comprising first and second stress relaxation rings. The present invention is used for absorbing or reducing impact after nail shooting, effectively prevents parts such as a shell and a cylinder on the nail gun from damage due to impact by the piston, prolongs a service life of the nail gun, avoids changing materials of parts such as the shell, makes the nail gun light, and is good for cost saving, promotion, and application.

Accordingly, in order to accomplish the above objects, the present invention provides a stress relaxation device for a nail gun, comprising: a shell, a cylinder disposed in the shell, a piston disposed in the cylinder and consisting of a piston rod and a piston disc, a gear frame coated on a front segment of a cylinder exterior, and a nail tube. The nail gun also comprises a stress relaxation device disposed in the cylinder. The stress relaxation device comprises a first stress relaxation ring, a second stress relaxation ring and a stress relaxation unit. The first stress relaxation ring and the second stress relaxation ring are both connected with the stress relaxation ring and not in relative movement to the stress relaxation unit.

Furthermore, the stress relaxation unit is integrally molded by a connecting disc, a connecting tube, and a connecting portion located therebetween; a rear end portion of the connecting disc is internally provided with an accommodating space; and the connecting portion is provided with an annular groove.

The first stress relaxation ring is sleeved in the accommodating space at the rear end of the connecting disc.

The second stress relaxation ring is sleeved in the annular groove of the connecting portion of the stress relaxation unit.

A joint part of the piston disc and the piston rod are cone-shaped, while the accommodating space at a rear end of the stress relaxation unit is internally provided with a conical chamber matched with the joint part in shape.

The nail gun further comprises a stress relaxation nut and a resetting spring; the resetting spring is located between a drive frame and the cylinder; the stress relaxation nut penetrates through the resetting spring and a rear end of the stress relaxation nut is pressed against the gear frame at a rear end; and a rear end portion of the nail tube and a front end portion of the stress relaxation unit are pressed against each other and both are located in the stress relaxation nut.

The nail tube pushes the stress relaxation unit and the second stress relaxation ring jointed with the stress relaxation unit to move backward before shooting nails and when a front end of the nail tube is pressed against a nail shooting working surface, so a gap between the second stress relaxation ring and a front end of the cylinder appears.

The first and second stress relaxation rings are made from a deformable shock absorption material.

The present invention has the following beneficial effects: the stress relaxation and shock absorption device comprise the stress relaxation unit, the first and second stress relaxation rings in the nail gun are used for absorbing or reducing impact after nail shooting. A specific method thereof comprises steps of: generating the primary stress relaxation when the piston disc makes contact with the first stress relaxation ring; generating the secondary stress relaxation when the front end of the joint part of the piston disc and completely jointing the piston rod with the cone-shaped chamber of the stress relaxation unit; generating the third stress relaxation by the gap between the second stress relaxation ring and the front end of the cylinder when the piston and the stress relaxation unit continuously move after jointing; if the nailing depth is greater than the gap, then the piston moves continuously, contacting the cylinder wall by the second stress relaxation ring, and then generating the fourth stress relaxation. Compared with the existing products, the present invention effectively prevents parts such as the shell and cylinder on the nail gun from damage due to impact by the piston rod, prolongs the service life of the nail gun, avoids changing materials of the parts such as the shell, makes the nail gun light, and is good for cost saving, promotion, and application.

These and other objectives, features, and advantages of the present invention will become apparent from the following detailed description, the accompanying drawings, and the appended claims.

DETAILED DESCRIPTION OF THE PREFERRED EMBODIMENT

For a description related to the direction in this patent application document, the shooting direction of the nail gun is uniformly defined as the front.

Figure 1:
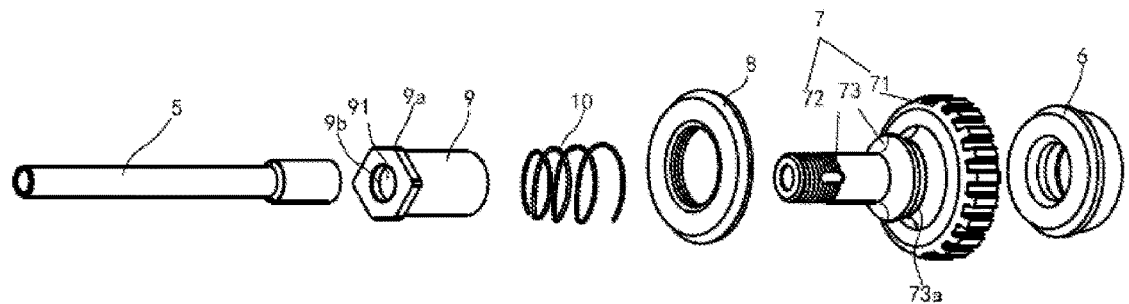
FIG. 1 is a front sectional view of the present invention in the natural state.
Figure 2:
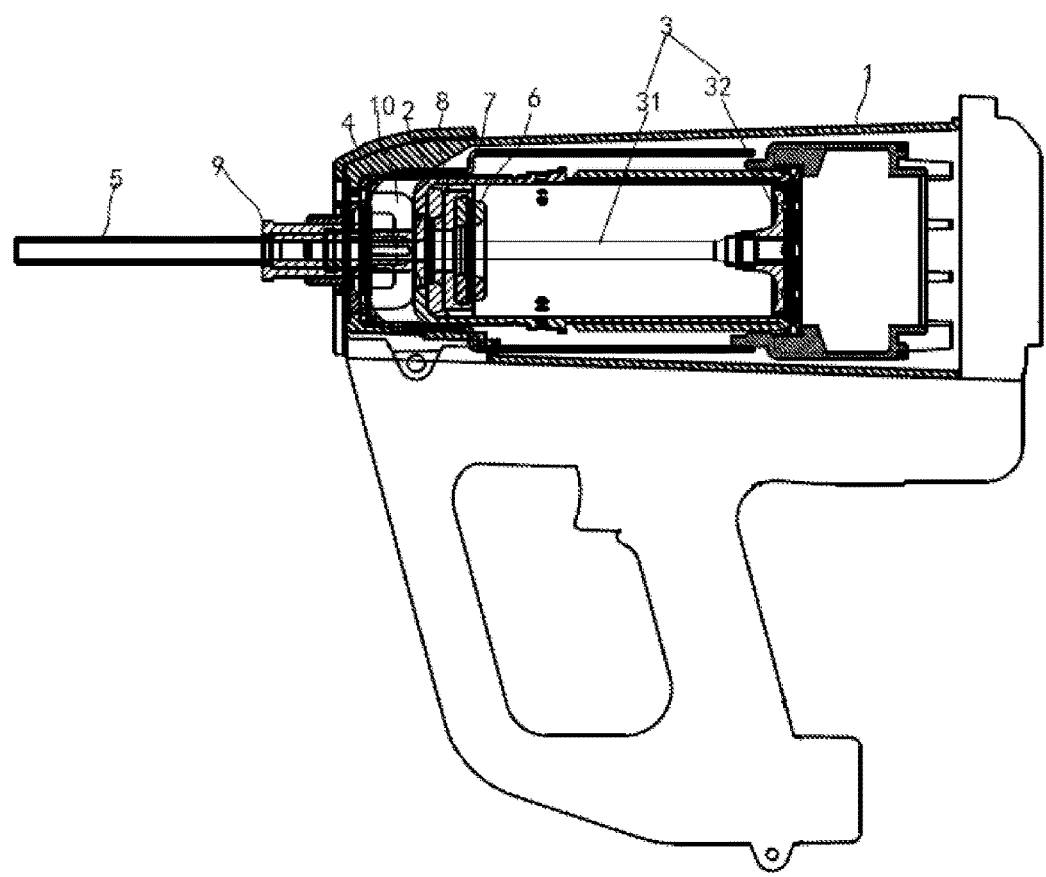
FIG. 2 is an exploded view of the stress relaxation device and the jointed nail shooting device of the present invention.

As shown in FIG. 1-2, the nail gun comprises a shell 1, a cylinder 2 disposed in the shell 1, a piston 3 consisting of a piston rod 31 and a piston disc 32, a gear frame 4 coated on the front section of a cylinder exterior, and a nail tube 5.

The nail gun also comprises a stress relaxation device disposed in the cylinder. The stress relaxation device comprises a stress relaxation unit 7 sleeved on the piston rod 31, a first stress relaxation ring 6 and a second stress relaxation ring 8 connected to the stress relaxation unit 7. The nail gun further comprises a stress relaxation nut 9 and a resetting spring 10. The resetting spring 10 is located between a gear frame 4 and the cylinder 2. The stress relaxation nut 9 penetrates through the resetting spring 10 and a rear end of the stress relaxation 9 is pressed against the gear frame 4. A rear end portion of the nail tube 5 and a front end portion of the stress relaxation unit are pressed against each other and are both located in the stress relaxation nut 9.

The first stress relaxation ring 6 and the second stress relaxation ring 8 are made from rubber or other deformable flexible materials for absorbing shock and reducing stress; wherein:

The stress relaxation unit 7 is integrally molded by a connecting plate 71, a connecting tube 72 and a connecting portion 73 located therebetween. The connecting portion 73 is provided with an annular groove 73a. The second stress relaxation ring 8 is sleeved on the annular groove 73a, so the second stress relaxation ring 8 and the stress relaxation unit 7 cannot move relative to each other. A front end of the connecting tube 72 is disposed in the stress relaxation nut 9 and is pressed against the nail tube 5. The connecting tube 72 is in threaded connection with the stress relaxation nut 9.

A rear end portion of the connecting disc 71 of the stress relaxation unit 7 is provided with an accommodating space 71a. A front end of the first stress relaxation ring 6 is embedded in the accommodating space 71a, so the first stress relaxation ring 6 is connected with the stress relaxation unit 7 and located on a rear of the stress relaxation unit.

A front end of the stress relaxation nut 9 is provided with a radial, annular, outward flange 9a and an annular inward flange 9b. In the natural state, a rear wall of the annular inward flange is pressed against the rear end portion of the nail tube 5.

Figure 3:
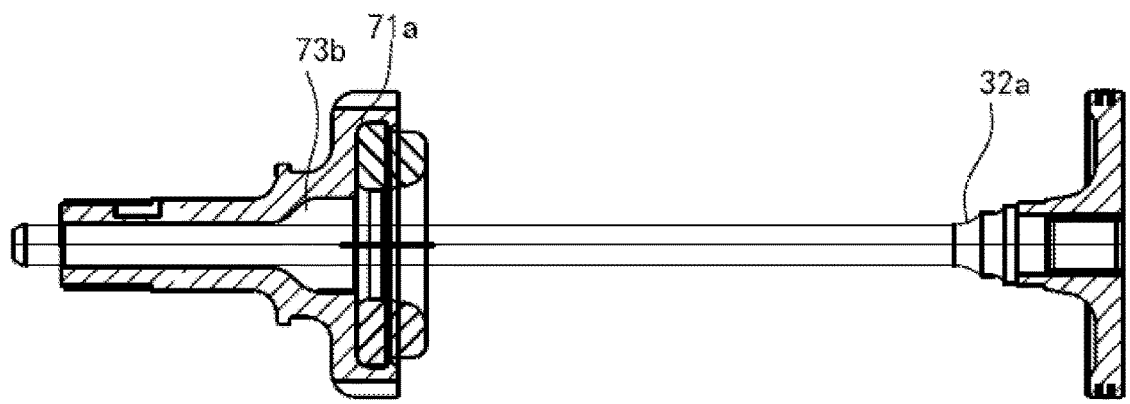
FIG. 3 is a schematic view of the stress relaxation unit and the piston of the present invention before jointing.

FIG. 1 is the exploded view of the stress relaxation device and the nail shooting device, comprising the first stress relaxation ring 6, the stress relaxation unit 7, the second stress relaxation ring 8, the stress relaxation nut 9 and the resetting spring 10. As shown in FIG. 3, a flange portion of the first stress relaxation ring 6 is embedded in the accommodating space 71a located at the rear end portion of the connecting disc 71 of the stress relaxation unit 7; the connecting portion 73 is provided with the annular groove 73a, and the second stress relaxation ring 8 is sleeved on the annular groove 73a of the connecting portion 73, thus forming an assembly.

An installation method comprises steps of: penetrating the connecting tube 72 on the stress relaxation tube 7 of the assembly through the resetting spring 10 and a hole on the gear frame 4, and screwing the stress relaxation nut 9 on the connecting tube 72. The nail tube 5 shall be installed before screwing the stress relaxation nut 9. A method for installing the nail tube 5 comprises steps of: processing the external circle of the nail tube 5 penetration through a hole 91 of the stress relaxation nut 9, and pressing an end face against the connecting tube 72.

Figure 4:
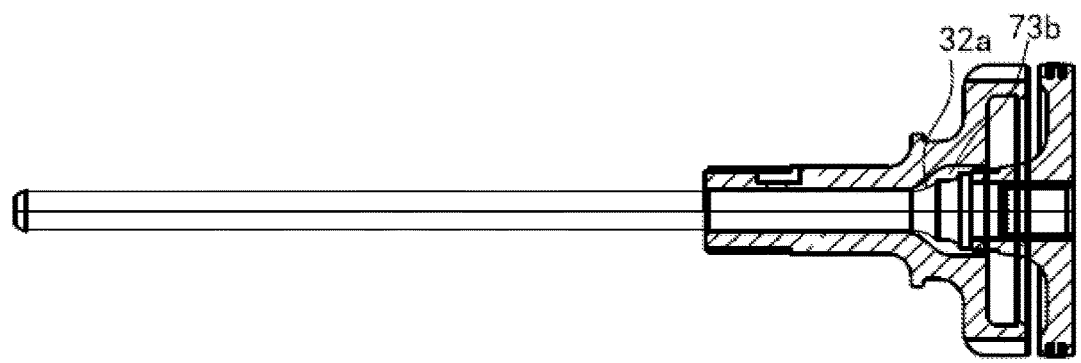
FIG. 4 is a schematic view of the stress relaxation unit and the piston of the present invention after jointing.

As shown in FIG. 3-4, a joint part 32a of the piston disc and the piston rod are cone-shaped, while the accommodating space at the rear end of the stress relaxation unit is internally provided with a conical chamber 73b matched with the joint part in shape.

Figure 5:
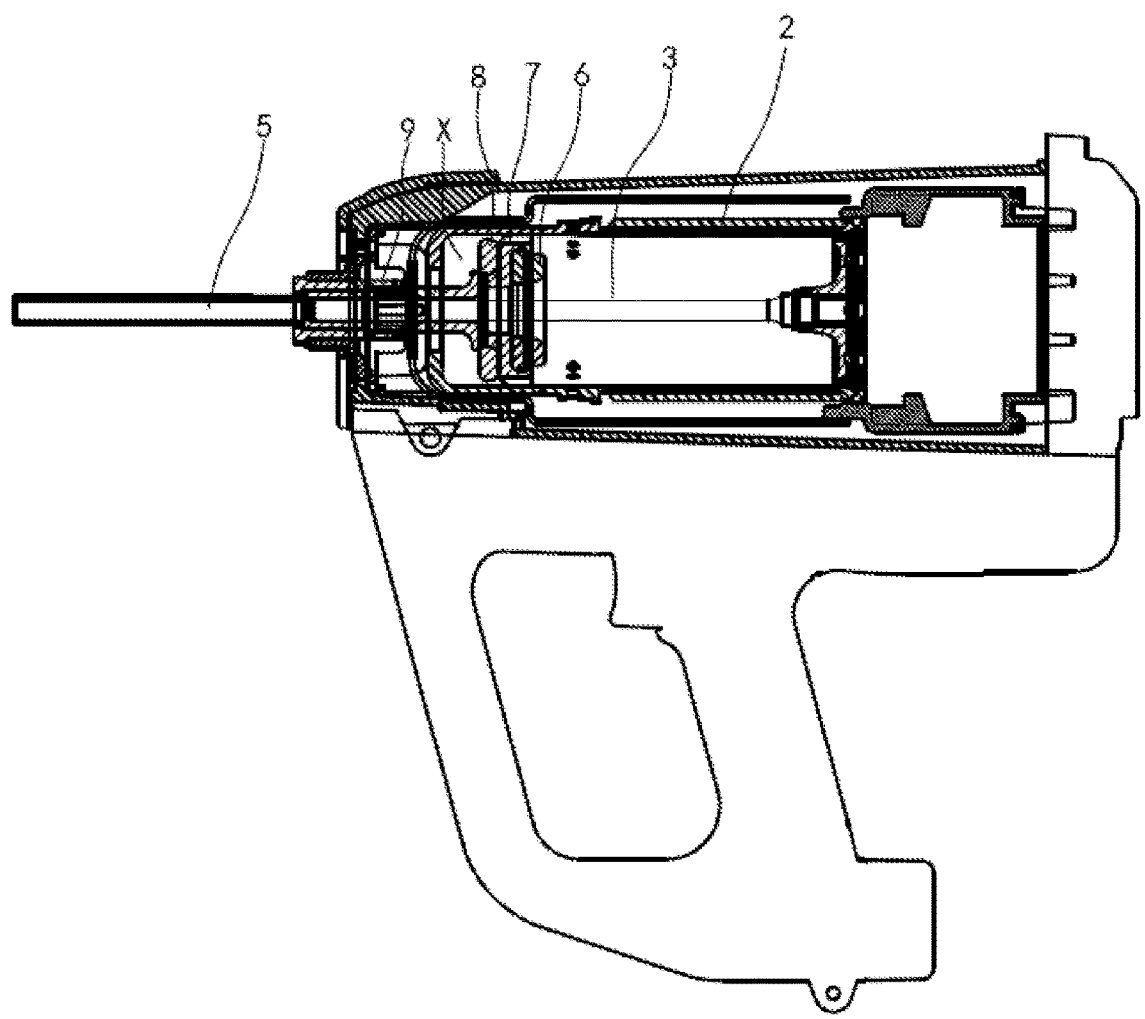
FIG. 5 is a schematic view of the present invention in the state of being compressed to shoot.

As shown in FIG. 5, a front end of the nail tube 5 is pressed against the nail shooting working surface for preparation before nail shooting. The nail tube 5 pushes the stress relaxation unit 7 and the first stress relaxation ring 6 and the second stress relaxation ring 8 jointed with the stress relaxation unit to move backward, so a gap X between the second stress relaxation 8 and a front end of the cylinder appears. Meanwhile, the stress relaxation nut 9 in threaded connection with the stress relaxation unit 7 moves backwards at the same time, and then the front end of the stress relaxation nut 9 pushes the gear frame 4 pressed against the stress relaxation nut to move backwards. Thus, the resetting spring 10 located between the gear frame 4 and the cylinder 2 is compressed. The resetting spring 10 springs back when the nail tube 5 is removed from the working surface, and then the gear frame 4, the stress relaxation nut 9, the nail tube 5 and the stress relaxation unit 7 reset.

For nail shooting on general conditions, the piston disc 32 on the piston first contacts with the second stress relaxation ring 8 after the piston 3 throws a nail into a wall. Under such conditions, the second stress relaxation ring 8 together with the first stress relaxation ring 6 forming an assembly keeps the gap X with an inner wall of the front end of the cylinder 2. A complementary wave of the impact is not directly transmitted to the shell or the cylinder, but absorbed by the first and second stress relaxation rings or transmitted to an outside through the nail tube, thus preventing the related parts on the nail gun from damage and being good for prolonging a service life of the nail gun.

Figure 6:
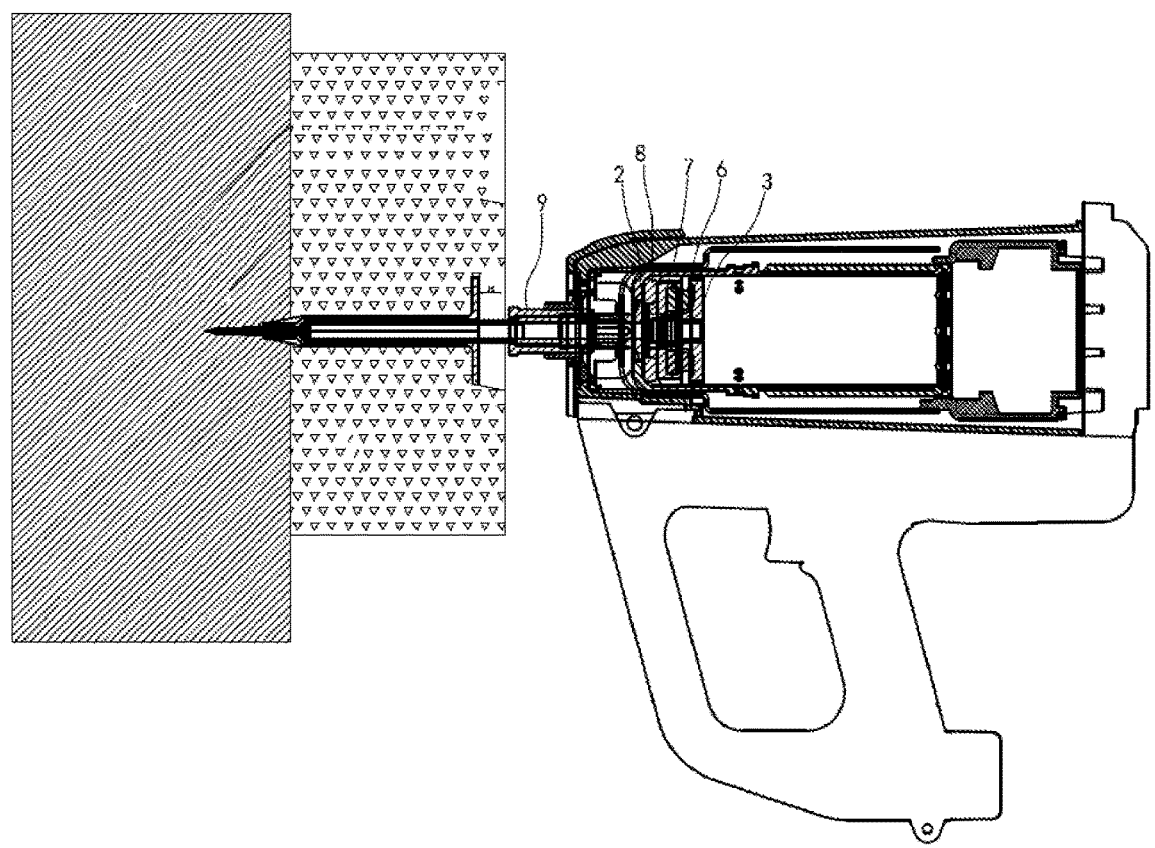
FIG. 6 is an operation view of the present invention on a soft base wall.

As shown in FIG. 6, in cases of nail shooting on a soft base wall, the stress relaxation unit 7 as well as first and second stress relaxation rings 6, 8 can transmit the complementary wave of the impact of the piston 3 to the wall when the nail is shot onto the soft base. Kinetic energy of the piston rod is continuously consumed when the piston rod impacts the nail to move into the soft base wall continuously. The kinetic energy of the piston rod has been greatly consumed after the nail moves in the wall. At this moment, the second stress relaxation ring 8 contacts with the inner wall of the front end of the cylinder 2. The cylinder and the shell absorb the rest, a little kinetic energy of the piston rod, and thereby effectively prevents the piston rod from breaking through the shell.

A specific stress relaxation method comprises steps of: generating the first stress relaxation when the piston disc 32 contacts the first stress relaxation ring 6; generating the second stress relaxation when the front end of the joint part 32a of the piston disc and the piston rod is completely jointed with the cone-shaped chamber 73b of the stress relaxation unit; generating the third stress relaxation by the gap X between the second stress relaxation ring 8 and the front end of the cylinder generates when the piston 3 and the stress relaxation unit 7 move continuously after jointing; if the nailing depth is greater than the gap X, the piston 3 moves continuously, contacting the cylinder by the second stress relaxation ring 8, and generating the fourth stress relaxation.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A stress relaxation device for the nail gun, wherein said nail gun comprising: a shell, a cylinder disposed in said shell, a piston disposed in said cylinder, comprising a piston rod and a piston disc, a gear frame coated on a front segment of a cylinder exterior, and a nail tube, wherein said nail gun also comprises a stress relaxation device disposed in said cylinder; said stress relaxation device comprises a first stress relaxation ring, a second stress relaxation ring and a stress relaxation unit; said first stress relaxation ring and said second stress relaxation ring are both connected with said stress relaxation unit and not in relative movement to said stress relaxation unit;

wherein said stress relaxation unit is integrally molded by a connecting disc, a connecting tube and a connecting portion located therebetween; a rear end of said connecting disc is internally provided with an accommodating space; and said connecting portion is provided with an annular groove.

2. The stress relaxation device for the nail gun, as recited in claim 1, wherein said first stress relaxation ring is sleeved in said accommodating space at said rear end of said connecting disc.

3. The stress relaxation device for the nail gun, as recited in claim 1, wherein said second stress relaxation ring is sleeved in said annular groove of said connecting portion of said stress relaxation unit.

4. A stress relaxation device for the nail gun, wherein said nail gun comprising: a shell, a cylinder disposed in said shell, a piston disposed in said cylinder, comprising a piston rod and a piston disc, a gear frame coated on a front segment of a cylinder exterior, and a nail tube, wherein said nail gun also comprises a stress relaxation device disposed in said cylinder; said stress relaxation device comprises a first stress relaxation ring, a second stress relaxation ring and a stress relaxation unit; said first stress relaxation ring and said second stress relaxation ring are both connected with said stress relaxation unit and not in relative movement to said stress relaxation unit;

wherein said nail gun further comprises a stress relaxation nut and a resetting spring; said resetting spring is located between a drive frame and said cylinder; said stress relaxation nut penetrates through said resetting spring and a rear end of said stress relaxation nut is pressed against said gear frame at a rear end; and a rear end portion of said nail tube and a front end portion of said stress relaxation unit are pressed against each other and both are located in said stress relaxation nut.

5. A stress relaxation device for the nail gun, wherein said nail gun comprising: a shell, a cylinder disposed in said shell, a piston disposed in said cylinder, comprising a piston rod and a piston disc, a gear frame coated on a front segment of a cylinder exterior, and a nail tube, wherein said nail gun also comprises a stress relaxation device disposed in said cylinder; said stress relaxation device comprises a first stress relaxation ring, a second stress relaxation ring and a stress relaxation unit; said first stress relaxation ring and said second stress relaxation ring are both connected with said stress relaxation unit and not in relative movement to said stress relaxation unit;

wherein said nail tube pushes said stress relaxation unit and said second stress relaxation ring jointed with said stress relaxation unit to move backward before shooting nails and when a front end of said nail tube is pressed against a nail shooting working surface, so a gap between said second stress relaxation ring and a front end of said cylinder appear.

* * * * *